US005939174A

United States Patent [19]

Satoh

[11] Patent Number: 5,939,174

[45] Date of Patent: Aug. 17, 1999

[54] METHOD AND APPARATUS FOR MIXING TWO OR MORE KINDS OF RESIN MATERIAL LIQUIDS

[75] Inventor: Akio Satoh, Atsugi, Japan

[73] Assignee: Ricoh Company, Ltd., Tokyo, Japan

[21] Appl. No.: 08/999,303

[22] Filed: Dec. 29, 1997

Related U.S. Application Data

[63] Continuation of application No. 08/636,042, Apr. 22, 1996, Pat. No. 5,746,981.

[30] Foreign Application Priority Data

| | | | |
|---|---|---|---|
| Apr. 24, 1995 | [JP] | Japan | 7-98832 |
| Apr. 24, 1995 | [JP] | Japan | 7-98833 |
| Apr. 24, 1995 | [JP] | Japan | 7-98834 |
| Mar. 29, 1996 | [JP] | Japan | 8-75540 |
| Mar. 29, 1996 | [JP] | Japan | 8-75541 |
| Mar. 29, 1996 | [JP] | Japan | 8-75542 |

[51] Int. Cl.[6] .......... B32B 3/00

[52] U.S. Cl. .......... 428/172; 428/158

[58] Field of Search .......... 428/167, 168, 428/172, 141, 158, 188, 316.6; 264/407

[56] References Cited

U.S. PATENT DOCUMENTS

| | | | |
|---|---|---|---|
| 4,579,767 | 4/1986 | Coggan et al. | 428/167 |
| 4,670,321 | 6/1987 | Holmqvist | 428/168 |
| 5,358,773 | 10/1994 | Fujii et al. | 428/167 |

*Primary Examiner*—Donald Loney

*Attorney, Agent, or Firm*—Cooper & Dunham LLP

[57] ABSTRACT

A method of mixing two or more kinds of adhesive resin liquids takes the steps of arranging such that resin outlet ports (6*a*, 7*a*) of feed tubes (6, 7) for feeding two or more kinds of resin material liquids which are hardened by reaction face a side skin surface (3*b*) of an ultrasonic wave transmission solid horn (3), allowing the resin material liquids to flow down passing along the side skin surface (3*b*) while applying ultrasonic vibrations to the resin material liquids, and guiding the resin material liquids to a distal end face (3*a*) of the ultrasonic wave transmission solid horn (3), thereby mixing the resin material liquids in an aerial state.

9 Claims, 8 Drawing Sheets

METHOD AND APPARATUS FOR MIXING TWO OR MORE KINDS OF RESIN MATERIAL LIQUIDS

This is a continuation of application Ser. No. 636,042, filed Apr. 22, 1996 now U.S. Pat. No. 5,746,981.

BACKGROUND OF THE INVENTION

1. Field of the Invention

This invention relates to an improvement of a method for mixing two or more kinds of resin material liquids which are hardened by reaction, utilizing ultrasonic vibrations and an apparatus for mixing those resin material liquids.

2. Description of the Prior Art

Heretofore, as a method for mixing two or more kinds of liquids utilizing ultrasonic vibrations and an apparatus for mixing those liquids, there are known the following methods and apparatuses. For example, Japanese Patent Publication No. 57374/1987 teaches that a distal end of an ultrasonic wave transmission solid horn is slightly dipped in two or more kinds of liquids reserved in an emulsion vessel as a mixing vessel, and the liquids are emulsified under the effect of cavitation by ultrasonic waves, and Japanese Patent Application Laid-Open No. 67326/1983 discloses that a distal end of an ultrasonic wave transmission solid horn is slightly dipped in two or more kinds of liquids reserved in an emulsion vessel as a mixing vessel which is in communication with atmospheric air, and the liquids are emulsified under the effect of cavitation by ultrasonic waves. Similarly, Japanese Patent Application Laid-Open No. 38132/1989 teaches that a double liquid (two-part liquid) adhesive agent as a resin material liquid is reserved in a receiving vessel as a mixing vessel and then mixed by ultrasonic waves, and Japanese Patent Application Laid-Open No. 115444/1989 discloses that disperse phase liquid and continuous phase liquid are mixed together in a cylinder as a mixing vessel using ultrasonic waves. Further, Japanese Patent Application Laid-Open No. 49999/1993 teaches that a mixing cup having an inverted conical shape is prepared, a conical horn is disposed at the center within the mixing cup, a resin outlet port of a conduit tube as a feed tube of resin material liquid is arranged to face a side skin surface of an ultrasonic wave transmission solid horn, and resin material liquid as adhesive is discharged to the side skin surface from the resin outlet port and guided to a distal end of the ultrasonic wave transmission solid horn along the side skin surface of the ultrasonic wave transmission solid horn, so that the resin material liquid is agitated and mixed by applying a rotational motion to the adhesive which contacts the ultrasonic wave transmission solid horn, and Japanese Patent Application Laid-Open No. 198889/1994 discloses that an ultrasonic wave transmission solid horn is installed in a guide tube as a mixing vessel, the first liquid and the second liquid are discharged toward a distal end face of the ultrasonic wave transmission solid horn to apply ultrasonic vibrations to the first and second liquids, thereby mixing the first and second liquids together. Furthermore, Japanese Patent Application Laid-Open No. 57229/1894 discloses an agitating/mixing method in which two or more kinds of adhesives are put into an agitating vessel as a mixing vessel and are mixed together by applying ultrasonic waves thereto while mechanically agitating the same.

In this way, the conventional methods and apparatuses for mixing liquids utilizing ultrasonic waves employ a method for mixing two or more kinds of liquids within a mixing vessel.

Moreover, Japanese Patent Application Laid-Open No. 118124/1986 discloses, although this does not employ the ultrasonic vibration technique, that a mixing member having a semi-circular shape in section is installed in an inclined posture, a high viscous liquid and a low viscous liquid are supplied thereto, and vibrations are applied at 60 cycles to the mixed member by a vibration mechanism, thereby mixing and agitating the flowing-down liquids, and Japanese Patent Application No. 217223/1991 discloses that a channel member is resonated by a vibration generating instrument so that a molding material composed of a colorant, a plastic element, an additive and the like is mixed in the channel of the channel member.

Of all the two or more kinds of resin material liquids, there are some which are hardened by reaction. However, if it is designed such that the two or more kinds of resin material liquids are mixed in a mixing vessel, the hardening reaction is progressed as the resin material liquids are mixed. This method is acceptable to a case where a work for feeding the mixed resin, whioh is undergoing the hardening reaction, to the downstream side from the mixing vessel while supplying the two or more kinds of resin material liquids which are hardened by reaction and discharging the same is performed continuously for a long time. However, it is difficult to apply such a method to a case where a work is required to be performed intermittently at comparatively short time intervals because the hardening reaction is continued in the mixing vessel even during the time the work is stopped. It gives rise to such problems that hardened resin tends to adhere to the inner side of the mixing vessel, composition of the two or more kinds of resin material liquids present within the mixing vessel is changed, and the like. To avoid this, immediately after the interruption or stop of the work, immediately before the work is started. It was customary that the inner side of the mixing vessel is cleaned with solvent every time or with appropriate time intervals. It is advisable not to use solvent as much as possible in view of labor safety and environmental pollution. In case it is necessary to resume the work immediately after the cleaning operation is made, there is a possibility that solvent is accidentally admixed and therefore it becomes necessary to make an empty discharge taking into consideration a possible variation of composition of the resin material liquids, etc. This is not desirable in view of disposal of wastes. Moreover, since it becomes necessary to prepare a cleaning or washing device, a problem is encountered in which the mixing apparatus itself becomes large in size.

It is, therefore, an object of the present invention to provide a mixing method and a mixing apparatus, in which two or more kinds of liquids, which are hardened by reaction, are mixed together without using any mixing vessel.

SUMMARY OF THE INVENTION

A method for mixing two or more kinds of resin material liquids according to an aspect of the present invention is characterized by comprising the steps of arranging such that resin outlet ports of feed tubes for feeding two or more kinds of resin material liquids which are hardened by reaction face a side skin surface of an ultrasonic wave transmission solid horn, allowing the resin material liquids to flow down passing along the side skin surface while applying ultrasonic vibrations to the resin material liquids, and guiding the resin material liquids to a distal end face of the ultrasonic wave transmission solid horn, thereby mixing the resin material liquids in an aerial state.

In the above-mentioned method, each of the resin outlet ports is located in an area within a range of a quarter wavelength of acoustic waves propagating through the ultrasonic wave transmission solid horn from the distal end face of the ultrasonic wave transmission solid horn.

Further, in the method, at least one kind of the two or more kinds of resin material is fed to the side skin surface from above the remaining other kinds of resin material liquids.

Further, in the method, adhesive force of the at least one kind of resin material liquid with respect to the side skin surface is smaller then that of the other kinds of resin material liquids with respect to the side skin surface.

Further, in the method, a feed amount of the one kind of resin material liquid to the side skin surface is larger than that of the remaining other kinds of resin material liquids to the side skin surface.

Further, in the method, the two or more kinds of resin material liquids are mixed at the distal end face of the ultrasonic wave transmission solid horn first and then the mixed resin material liquids are allowed to flow down to a resin material liquid guide groove formed in an objective material to be coated, thereby coating the objective material.

Further, in the method, the distal end face of the ultrasonic wave transmission solid horn is inserted in the resin material liquid guide groove formed in the objective member and the two or more kinds of resin material liquids are mixed together between a bottom surface of the resin material guide groove and the distal end face of the ultrasonic wave transmission solid horn, thereby coating the objective member.

Further, in the method, flow rates of the resin material liquids discharged respectively from the resin outlet ports of the feed tubes are approximately the same.

An apparatus for mixing two or more kinds of resin material liquids according to an aspect of the present invention is characterized in that the apparatus comprises a plurality of feed tubes for feeding two or more kinds of resin material liquids which are hardened by reaction, and an ultrasonic wave transmission solid horn. Resin outlet ports of the feed tubes are faced onto a side skin surface of the ultrasonic wave transmission solid horn. The resin material liquids are allowed to flow down passing along the side skin surface while applying ultrasonic vibrations to the resin material liquids and be guided to a distal end face of the ultrasonic wave transmission solid horn, thereby the resin material liquids are mixed in an aerial state.

In the above-mentioned apparatus, each of the resin outlet ports is located in an area within a range of a quarter wavelength of acoustic waves propagating through the ultrasonic wave transmission solid horn from the distal end face of the ultrasonic wave transmission solid horn.

Further, in the apparatus, a resin outlet port for at least one kind of the two or more kinds of resin material liquids is disposed at a higher location than the resin outlet ports for the remaining other kinds of resin material liquids.

Further, in the apparatus, adhesive force of the at least one kind of resin material liquid fed from the feed tube disposed at a higher location with respect to the side skin surface is smaller than that of the other kinds of resin material liquids fed from the feed tubes disposed at a lower location with respect to the side skin surface.

Further, in the apparatus, the distal end face of the ultrasonic wave transmission solid horn is located immediately above a resin material liquid guide groove formed in an objective member to be coated.

Further, in the apparatus, the distal end face of the ultrasonic wave transmission solid horn is inserted in the resin material liquid guide groove formed in the objective member.

The apparatus is characterized in that the apparatus further comprises a movement control device for controlling the movement of the distal end face of the ultrasonic wave transmission solid horn along a resin material liquid guide groove formed in an objective member to be coated.

In the apparatus, flow rates of the resin material liquids discharged respectively from the resin outlet ports of the feed tubes are approximately the same.

Further, in the apparatus, the ultrasonic wave transmission solid horn is vertically installed.

A method and an apparatus for mixing two or more kinds of resin material liquids according to another aspect of the present invention are characterized, in order to solve the above-mentioned problems, in that a resin outlet port of a plurality of feed tubes for feeding two or more kinds of resin material liquids which are hardened by reaction and a distal end portion of tn ultrasonic wave transmission horn are faced onto a resin material liquid guide groove formed in in objective member to be coated, and the other resin outlet port of the plurality of feed tubes is faced onto a side skin surface of the ultrasonic wave transmission solid horn. The resin material liquid is allowed to flow down into the resin material liquid guide groove from the first-mentioned resin outlet port. The distal end portion of the ultrasonic wave transmission solid horn is allowed to contact the resin material liquid poured into the resin material liquid guide groove to apply ultrasonic vibrations to the resin material liquid discharged from the first-mentioned resin outlet port. The resin material liquid discharged from the second-mentioned resin outlet port is allowed to flow down along the side skin surface while applying ultrasonic vibrations to the resin material liquid, thereby the resin material liquids are mixed in the resin material liquid guide groove.

In the method and apparatus, the second-mentioned resin outlet port facing the side skin surface is located in an area within a range of a quarter wavelength of acoustic waves propagating through the ultrasonic wave transmission solid horn from the distal end face of the ultrasonic wave transmission solid horn.

Further, in the method and apparatus, if feed amounts of the two or more kinds of resin material liquids are different, that resin material liquid which is smaller in feed amount is allowed to flow down along the side skin surface of the ultrasonic wave transmission solid horn.

Further, in the method and apparatus, if feed amounts of the two or more kinds of resin material liquids are same, that resin material liquid which is smaller in adhesive force with respect to the side skin surface is allowed to flow down along the side skin surface.

Further, in the method and apparatus, the distal end portion of the ultrasonic wave transmission solid horn is inserted in the resin material liquid guide groove.

Further, in the method and apparatus, the first-mentioned resin outlet part facing the resin material liquid guide groove is disposed on an upstream side of the ultrasonic wave transmission solid horn.

Further, in the method and apparatus, the first-mentioned resin outlet port is moved along the resin material liquid guide groove.

Further, in the method and apparatus, the distal end of the ultrasonic wave transmission solid horn is moved to follow the movement of the first-mentioned outlet port along the resin material liquid guide groove.

According to the invention mentioned above, one kind of two or more kinds of resin material liquids is poured directly into the resin material liquid guide groove, while the remaining resin material liquids are poured down to the resin material liquid guide groove along the side skin surface of the ultrasonic wave transmission solid horn while being supplied with ultrasonic vibrations. Then, the two or more kinds of resin material liquids are supplied with ultrasonic vibrations within the resin material liquid guide groove by the ultrasonic wave transmission solid horn, and the two or more kinds of resin material liquids are mixed together. Accordingly, there is no need of a provision of the mixing vessel for the resin material liquids. Further, since this is a method for applying ultrasonic vibrations to the resin material liquids in the resin liquid guide groove, it can be prevented as much as possible that the resin material liquids are scattered outside the groove of the objective member to be coated.

A method and an apparatus for mixing two or more kinds of resin material liquids according to still another aspect of the present invention are characterized by comprising a plurality of feed tubes for feeding two or more kinds of resin material liquids which are hardened by reaction and an ultrasonic wave transmission solid horn. Resin outlet ports of the feed tube and a distal end portion of the ultrasonic wave transmission solid horn are located close to each other and are moved while allowing the two or more kinds of resin material liquids to simultaneously flow to an objective member to be coated. The distal end portion of the ultrasonic wave transmission horn is allowed to contact the resin material liquids immediately after the resin material liquids are poured on the objective member to apply ultrasonic vibrations to the resin material liquids, thereby the resin material liquids are mixed.

In the method and apparatus, the distal end portion of the ultrasonic wave transmission solid horn is moved following the movement of the resin outlet ports of the feed tubes.

The method and apparatus are characterized in that the method and apparatus comprises forming a resin material liquid guide groove in the objective member, allowing the resin outlet ports of the feed tubes to move along the resin material liquid groove to thereby allow the two or more kinds of resin material liquids to flow into the resin material liquid groove, and allowing the distal end portion of the ultrasonic wave transmission solid horn to move along the resin material liquid guide groove.

In the method and apparatus, the distal and portion of the ultrasonic wave transmission solid horn is inserted in the resin material liquid guide groove.

A method and an apparatus for mixing two or more kinds of resin material liquids according to still another aspect of the present invention are characterized by comprising a plurality of feed tubes for feeding two or more kinds of resin material liquids which are hardened by reaction and an ultrasonic wave transmission solid horn. Resin outlet ports of the feed tubes are spaced apart from each other, and a distal end portion of the ultrasonic wave transmission solid horn is spaced apart from the resin outlet ports. The resin outlet ports are moved such that one kind of the two or more kinds of resin material liquids is allowed to flow to an objective member to be coated first and then the remaining kinds of resin material liquids are allowed to flow. The distal end portion of the ultrasonic wave transmission solid horn is allowed to contact the resin material liquids poured on the objective member to follow the movement of the resin outlet ports while applying ultrasonic vibrations to the resin material liquids, thereby the two or more kinds of resin material liquids are mixed.

In the above-mentioned method and apparatus, a feed amount of at least one kind of the two kinds of resin material liquids with respect to the objective member is larger than that of the remaining kinds of resin material liquids with respect to the objective member, and the remaining kinds of resin material liquids are superimposed on the at least one kind of resin material liquid and led in that state.

Further, in the method and apparatus, adhesive force of at least one kind of the two or more kinds of resin material liquids with respect to the objective member is smaller than that of the remaining kinds of resin material liquids with respect to the objective member, and the remaining kinds of resin material liquids are superimposed on the at least one kind of resin material liquid and fed in that state.

Further, in the method and apparatus, a feed amount of the one kind of resin material liquid with respect to the objective member is larger than that of the remaining kinds of resin material liquids with respect to the objective member.

Further, in the method and apparatus, flow rates of the two or more kinds of resin material liquids are generally equal with each other.

According to the above-mentioned invention, after two or more kinds of resin material liquids are poured into the resin material liquid guide groove, they are supplied with ultrasonic vibrations by the ultrasonic wave transmission solid horn and mixed together in the resin material liquid guide groove. Accordingly, there is no need of a provision of any mixing vessel. Further, if it is arranged such that the resin material liquids are supplied with ultrasonic vibrations within the resin material liquid guide groove. It can be prevented as much as possible that the resin material liquids are scattered outside the objective member.

DETAILED DESCRIPTION OF THE PREFERRED EMBODIMENTS

Embodiment 1

Figure 1:
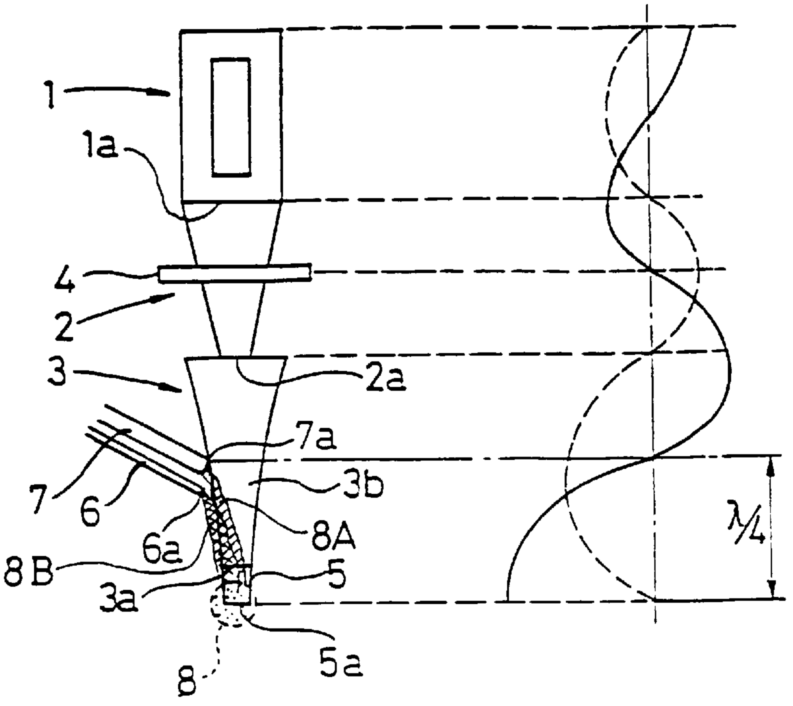
FIG. 1 is an explanatory view of a first embodiment of a method for mixing two or more kinds of resin material liquids according to the present invention.
Figure 2A:
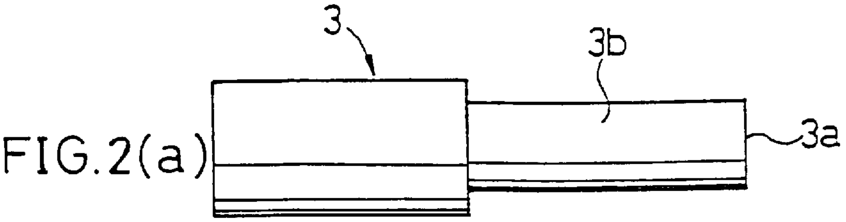
FIG. 2(*a*) to 2(*c*) show shapes of various kinds of ultrasonic wave transmission solid horns used for the method for mixing two or more resin material liquids according to the present invention, FIG. 2(*a*) shows an uniform sectional step shape, FIG. 2(*b*) shows a cone shape, and FIG. 2(*c*) shows a catenoidal shape.
Figure 2B:
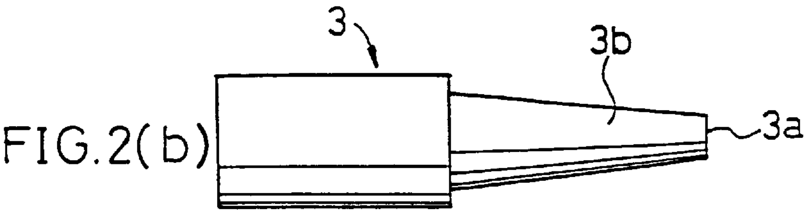
Figure 2C:
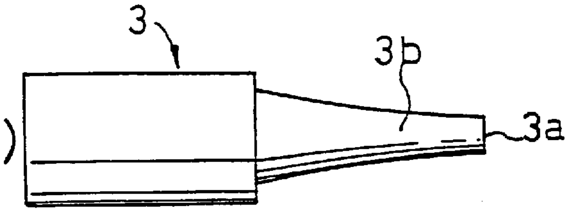

FIGS. 1 through 4 show a first embodiment of a method for mixing resin material liquids according to the present invention. In FIG. 1, reference numeral 1 denotes a vibrator as an electrical acoustic transformer; 2, a first stage ultrasonic wave transmission solid horn; 3, a second stage ultrasonic wave transmission solid horn; 4, a support flange; 5, a machine tool; and 6, 7, resin material liquid feed tubes, respectively. The ultrasonic wave transmission solid horn 2 is secured to a machine terminal 1*a* is of the vibrator 1 by welding, soldering or screw-jointing. The ultrasonic wave transmisslon solid horn 3 having tapped holes is, for example, screwed to a distal end face 2*a* of the ultrasonic wave transmission solid horn 2. The tool 5 is, for example, screwed to a distal end face 3*a* of the ultrasonic wave transmission solid horn 3. The ultrasonic wave transmission solid horn 3 shown in FIG. 1 has a side skin surface 3*b* whose shape is an exponential function shape. However, the shape of the side skin surface 3*b* may be any one of a uniform sectional step as shown in FIG. 2(*a*), a conical shape as shown in FIG. 2(*b*), and a catenoidal shape as shown in FIG. 2(*c*).

The feed tubes 6, 7 are used for feeding two kinds of resin material liquids 8A and 8B, respectively. As the resin material liquids, those of the liquid-fluidized type obtained during a midway process of reaction of a double liquid mixture foam hardened urethane type resin manufactured by Inoac Corporation are used here. A general composition of this double liquid mixture foam hardened urethane resin includes polyol (resin material liquid 8A) and isocyanate (resin material liquid 8B), and this urethane resin is obtained by mixing 100 weight parts of polyol, as a chief material, with 20 to 30 weight parts of isocyanate, as an assistant material. This double liquid mixture foam hardened type urethane resin is foam hardened through a foam reaction caused by urea bond between isocyanate and water and generating carbon dioxide and through a polymerization reaction caused by urethane bond between isocyanate and polyol and hardened. Its foaming power is about five times here. Catalyst, foam stabilizer, propellent or the like is preliminarily mixed to the resin material liquids. Otherwise, the catalyst, or the like may be fed as the third liquid during the time of mixing the resin material liquids.

The inside diameter of the feed tube 7 used here is larger than the inside diameter of the feed tube 6. The reason is that since the feed amount of polyol is larger than that of isocyanate, the flow rates are required to be made generally equal. Locations of the resin outlet ports 6*a*, 7*a* of the feed tubes 6, 7 are within a quarter wavelength (λ/4) of acoustic waves propagating through the ultrasonic wave transmission solid horn 3 from a distal end face of the tool 5. The resin outlet ports 6*a* and 7*a* faces the side skin surface 3*b* of the ultrasonic wave transmission solid horn 3 only with a very small space therebetween. The two kinds of resin material liquids 8A and 8B flow down along the side skin surface 3*b* in a way not to accidentally drop and are guided to the distal end face 5*a*. The vibrator 1 used here is of the automatic constant amplitude return control type having a nominal output of 100 W, an oscillation frequency of 28.6 KHz and an amplitude of 6 micron (zero to peak). The amplitude is increased by the horn so that the amplitude at the distal end face 5*a* of the tool 5 will be about eight times.

The resin outlet port 7*a* of the feed tube 7 is disposed at a location higher than the resin outlet port 6*a* of the other feed tube 6. The reason is that the adhesive force of the polyol fed by the feed tube 7 with respect to the side skin surface 3*b* is smaller than that of the isocyinato fed by the other feed tube 3 with respect to the side skin surface 3*b*. Another reason is that if the resin outlet port 6*a* of the feed tube 6 for feeding the isocyanate is instilled upwardly of the resin outlet port 7*a* of the feed tube 7 so as to flow down the isocyanate from above the polyol along the side skin surface 3*b*, it takes much time for the isocyanate to flow down, thus making it difficult to mix the isocyanate to the polyol. In contrast, if the polyol is poured from above the isocyanate, the isocyanate flows down along the stream of the polyol, thus making it easy to mix the isocyanate to the polyol. The term "adhesion" herein used refers to the phenomenon in which when two different kinds of substances are contacted with each other, they are caused to adhere.

Since the two different kinds of resin material liquids 8A and 8B proceed along the side skin surface 3*b* while being applied with ultrasonic vibrations, they flow down rapidly toward the distal end face 5*a* of the tool 5. Among all, since the resin outlet ports 6*a* and 6*b* are located within a range from the distal end face 5*a* of the tool 5 to a quarter wavelength (λ/4) of acoustic waves propagating through the ultrasonic wave transmission solid horn 3, they can flow down rapidly. One reason seems to be that since ultrasonic vibrations having large amplitude are applied to the resin material liquids 8A and 8B, viscous resistance between the elements of the resin material liquids 8A and 8B is lowered. Another reason seems to be that viscous resistance is reduced due to locally increased temperature of the resin material liquids 8A and 8B caused by the ultrasonic vibrations. The two different kinds of resin material liquids 8A and 8B are mixed together in an aerial state at the distal end face 5*a* of the tool 5. In a case of the resin material liquids 8A and 8B which are not changed in viscosity or which are increasad in viscosity after they are mixed together, when the feed amounts of the resin material liquids 8A and 8B from the resin outlet ports 6*a* and 7*b* are adjusted, they exhibit a spherical configuration so indicated by reference numeral 8. In a case of the resin materlal liqulds 8A and 8B which are temporarily decreased in viscosity by hardening reaction immediately after mixture as in the present invention, the resin material liquids 8A and 8B flow down rapidly from the distal end 5*a* of the tool 5.

According to this mixing method, when the feed of the resin material liquids 8A and 8B is stopped, it became difficult to visually recognize whether or not there is present a wet spot of the resin material liquids 8A and 8B on the side skin surface 3*b* after the passage of about 0.1 seconds. The oscillation frequency and amplitude of the distal end face 5*a* are preferred to be selected taking into consideration the efficiency of the mixture of the resin material liquids 8A and 8B and prevention of scattering of the resin material liquids 8A and 8B.

In this embodiment. the ultrasonic wave transmission solid horn 2 is attached to the vibrator 1. It should be noted, however, that a provision of the ultrasonic wave transmission solid horn 2 is not absolutely necessary. Similarly, the tool 5 is not absolutely necessary, but it may be provided in accordance with necessity. Accordingly, in the description to follow, both the ultrasonic wave transmission solid horn 2 and the tool 5 are omitted.

Embodiment 2

Figure 3:
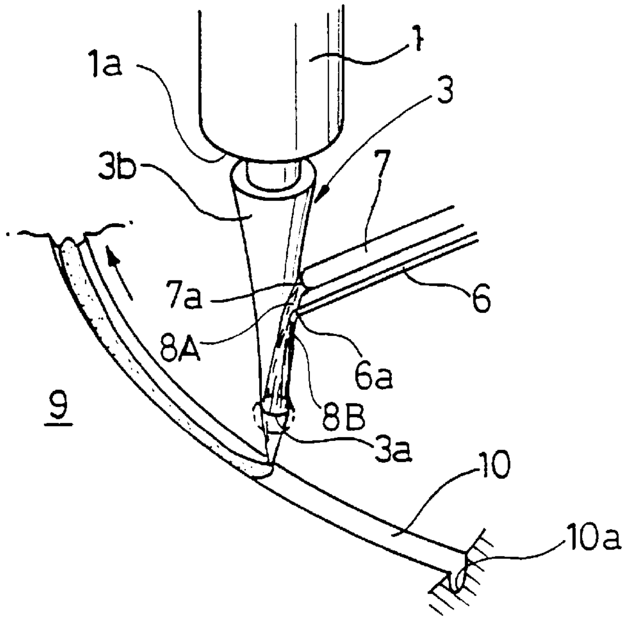
FIG. 3 is an explanatory view of a method for mixing two or more kinds of resin material liquids according to a second embodiment of the present invention.
Figure 4A:
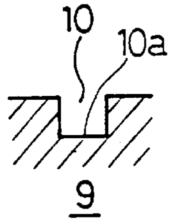
FIGS. 4(*a*) to 4(*e*) show sectional shapes of resin material liquid guide grooves formed in molded members, FIG. 4(*a*) shows a square shape, FIG. 4(*b*) shows a semi-arcuate shape, FIG. 4(*c*) shows a V-shape, FIG. 4(*d*) shows a shape obtained by chamfering an upper surface and a bottom surface, and FIG. 4(*e*) shows a shape obtained by chamfering a bottom surface.
Figure 4B:
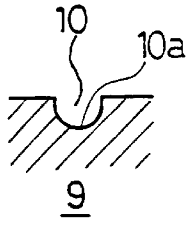
Figure 4C:
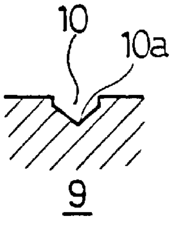
Figure 4D:
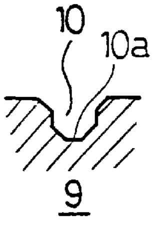
Figure 4E:
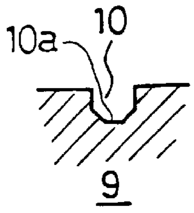

FIG. 3 is a explanatory view for explaining an embodiment for applying the resin material liquids 8A and 8B to a molded member utilizing a method for mixing two or more kinds of resin material liquids according to the present invention. In FIG. 3, reference numeral 9 denotes a molded member as an objective member to be coated, and 10 denotes a resin material liquid guide groove formed in the molded member. This resin material guide groove 10 is, for example, 3 mm in its width and depth. The molded member 9 is made by using, for example, an ABS resin material or a PC material. The distal end face 3*a* of the ultrasonic wave transmission solid horn 3 is faced immediately above the resin material liquid guide groove 10 and set to a location, for example, 5 mm above the bottom surface 10*a* of the resin material liquid guide groove 10. The ultrasonic wave transmission solid horn 3 is moved relative to the molded member 9 along the resin material liquid guide groove 10. In this case, either the ultrasonic wave transmission solid horn 3 or the molded member 9 may be moved.

Then the resin material liquids are discharged to the side skin surface 3*b* of the ultrasonic wave transmission solid horn 3 while applying ultrasonic vibrations thereto, the resin material liquids 8A and 8B flow down along the side skin surface 3*b,* are mixed together at the distal end face 3*a* of the ultrasonic wave transmission solid horn 3, and allowed to drop into the resin material liquid guide groove 10. By doing this, the resin material liquids 8A and 8B are applied along the resin material liquid guide groove 10 and are foamed and hardened with the progress of the reaction of the resin material liquids 8A and 8B.

This foam hardening progresses in the manner as described hereinafter. The resin saterial liquids 8A and 8B are made into a cream-like state by mixture and then bulged from the resin material liquid guide groove 10 by foaming. As a consequence, the surface of the tossed member is hardened to reach a tack-free state where no sticky feel is given to the hand contacting the surface of the foamed member. In this way, the resin material liquids 8A and 8B are finally hardened. It was confirmed through experiments that when the resin material liquids 8A and 8B are discharged to the side skin surface 3*b* without applying ultrasonic vibrations thereto and allowed to drop into the resin material liquid guide groove 10 along the side skin surface 3*b,* the resin material liquids 8A and 8B are accidentaily dropped and not foam-hardened. Therefore, it is clear that the two kinds of resin material liquids 8A and 8B are mixed enough to enhance a hardening reaction by applying the ultrasonic vibrations to the resin material liquids 8A and 8B. A small trace of the resin material liquids 8A and 8B remained on the ultrasonic wave transmission solid horn 3 can completely be wiped out by softly touching the side skin surface 3*b* with a piece of harmless liquid ethyl-alcohol contained absorbent cotton or the like.

The sectional shape of the resin material guide groove 10 may take any one of a square shape as shown in FIG. 4(*a*), a semi-arcuate shape as shown in FIG. 4(*b*), a V-shape as shown in FIG. 4(*c*), a shape obtained by chamfering its upper and bottom surfaces as shown in FIG. 4(*d*), and a shape obtained by chamfering its bottom surface as shown in FIG. 4(*e*).

Embodiment 3

Figure 5:
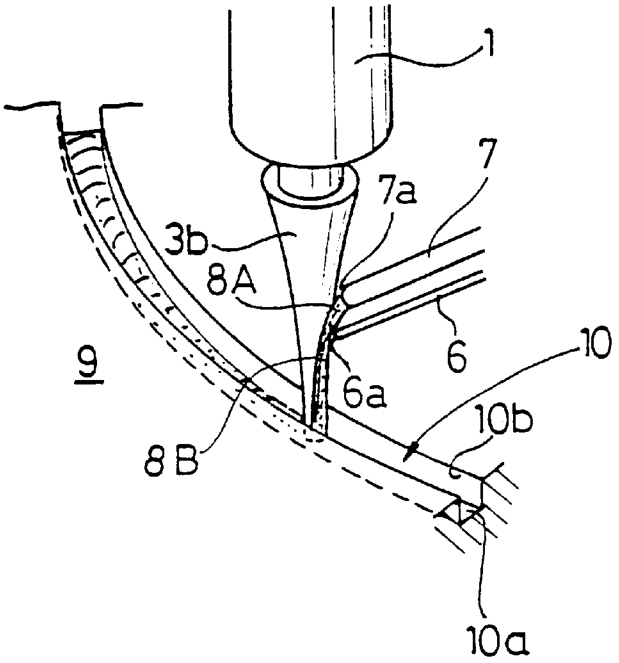
FIG. 5 is an explanatory view of a method for mixing two or more kinds of resin material liquids according to a third embodiment of the present invention.
Figure 6:
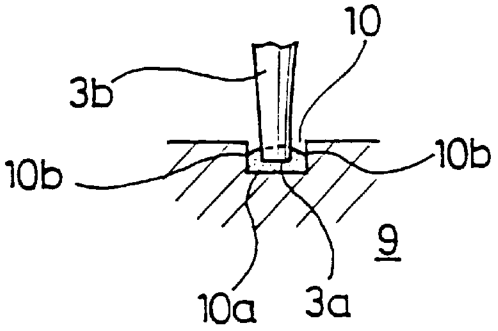
FIG. 6 is a partly sectional view showing a positional relationship between a resin material liquid groove and an ultrasonic wave transmission solid horn of FIG. 5.

FIG. 5 is an explanatory view for explaining another embodiment for applying resin material liquids to a molded member utilizing a method for mixing two or more kinds of resin material liquids according to the present invention. In this embodiment, the distal end face 3*a* of the ultrasonic wave transmission solid horn 3 is inserted in the resin material liquid guide groove 10, the distal end part of the ultrasonic wave transmission solid horn 3 is faced onto a wall surface 10*b* of the resin material liquid guide groove 10, and the distal end face 3*a* is set to a location 1 mm above the bottom surface 10. According to the third embodiment, the resin material liquids can more positively be applied along the interior of the resin material liquid guide groove 10 compared with the second embodiment, and the mixing efficiency of the resin material liquids can be enhanced.

Embodiment 4

Figure 7:
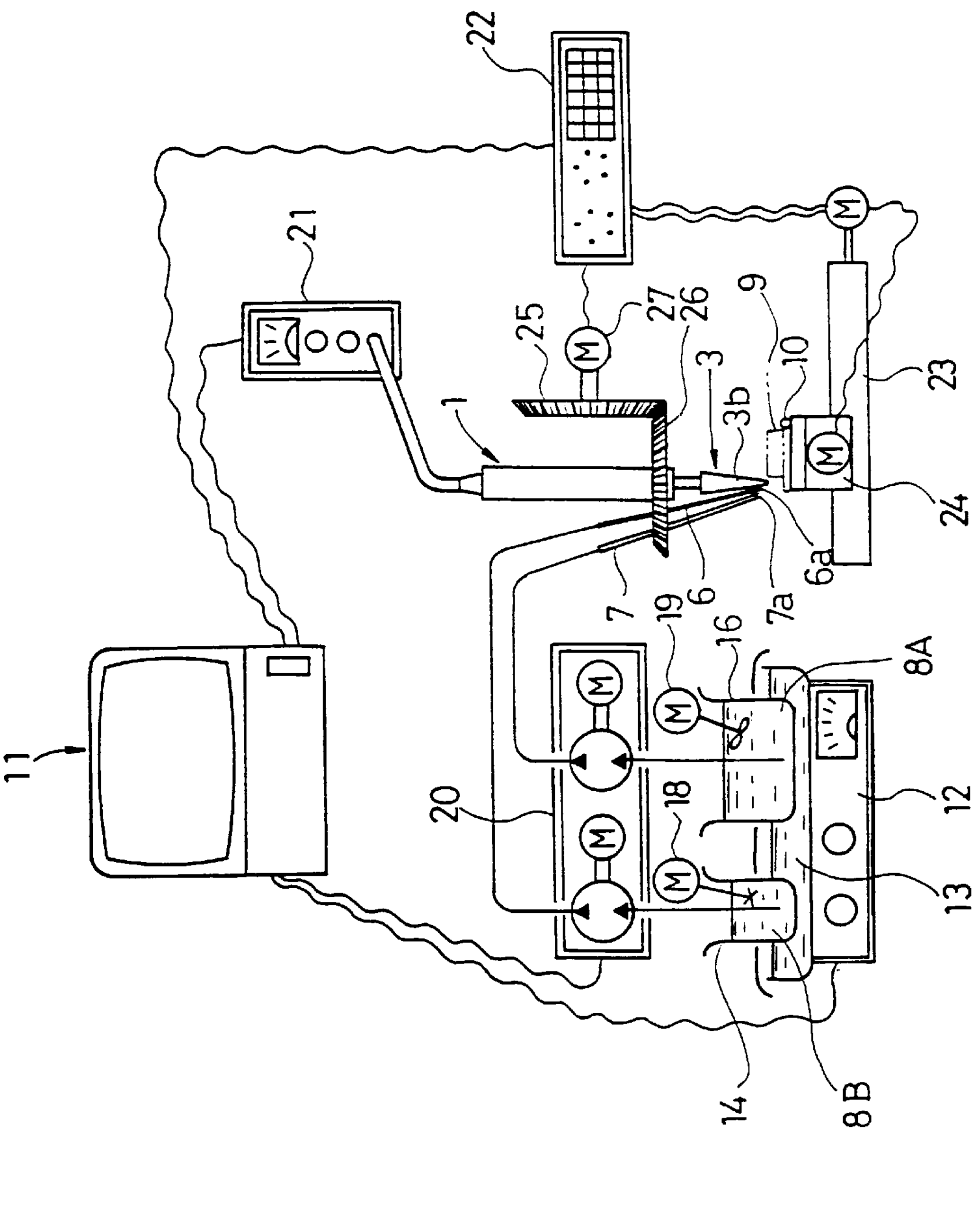
FIG. 7 is a schematic view showing an apparatus for mixing two or more kinds of resin material liquids according to the present invention.
Figure 8:
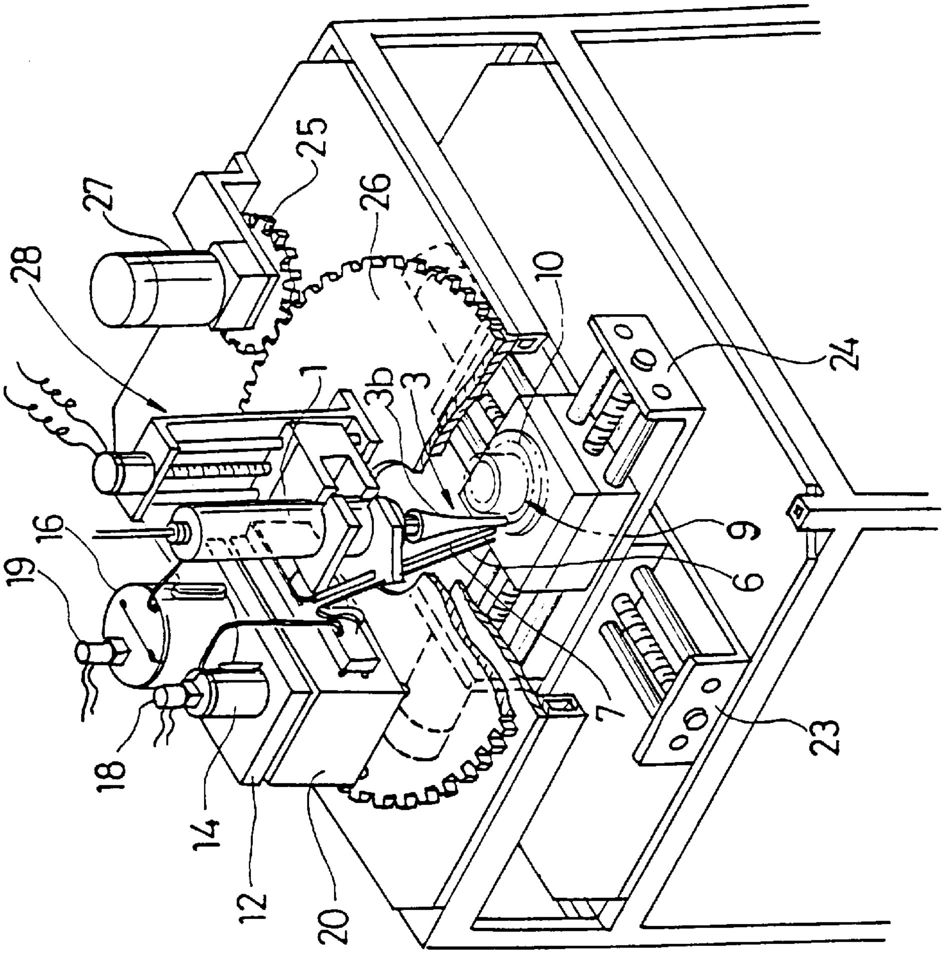
FIG. 8 is a perspective view showing a schematic construction of an apparatus for mixing two or more kinds of resin material liquids according to the present invention.

FIG. 7 depicts a schematic view of a mixing apparatus applicable to a method for mixing two or more kinds of resin material liquids according to the present invention, and FIG. 8 is a perspective view showing a general construction of a mixing apparatus applicable to the method for mixing two or more kinds of resin material liquids according to the present invention. In FIG. 7, reference numeral 11 denotes a general control unit; 12, a temperature adjusting device; 13, a hot water; 14, a container for reserving the resin material liquid 8B; 16, a container for reserving the resin material liquid 8A; 18 and 19, motors for agitating the resin material liquids 8A and 8B; 20, a feed control device for feeding the resin material liquids 8A and 8B to the feed tubes 6 and 7; 21, a high frequency power supply control unit; 22, a movement control device; 23, an X-direction movement mechanism; 24, a Y-direction movement mechanism; 25 and 26, bevel gears (spur gears in FIG. 8); and 27, a driving motor, respectively. The general control unit 11 has the role for totally controlling the temperature adjusting device 12, the feed control device 20, the high frequency power supply control device 21, and the movement control device 22.

The vibrator 1 is caused to generate ultrasonic vibrations at a predetermined oscillation frequency and amplitude by the high frequency power supply control device 21. The feed control device 20 includes a pump consisting of a servo motor or a pulse motor and adjusts ON/OFF of discharge, discharge amount, discharge rates of the resin material liquids 8A and 8B in accordance with instructions from the general control unit 11. The feed tubes 6 and 7 are preferred to be reduced in length as much as possible in order to avoid fluctuation of the internal capacity due to internal pressure and to minimize the irregularity of the foam rate and dimension of the foamed member after the resin material liquids are hardened. From the view point of avoiding changes of viscosity and specific gravity due to temperature change of the resin material liquids 8A and 8B and also from the view point of stabilizing the reaction speed, the temperature adjusting device 12 is used in order to maintain a constant temperature of the resin material liquids 8A and 8B. Aside from the task for driving and controlling the X-Y movement mechanisms 23 and 24, the movement control device 22 has the tasks for driving and controlling the ultrasonic wave transmission solid horn 8 in an upward and downward direction (Z-axis direction) by the driving mechanism 28, and establishing a circumferential direction (r direction) of the side skin surface 3*b* with respect to the feed tubes 6 and 7 as shown in FIG. 8. It may be arranged such that the feed tubes 6 and 7 are provided at distal end parts thereof with stop valves in order to avoid a possible delay of discharge and stop time caused by pressure fluctuation, etc., in the mid-way of tbe piping of the feed tubes 6 and 7.

The molded member 9 is, for example, a flanged cylinder as shown in FIG. 8. The resin material liquid guide groove 10 comprises an annular groove formed around a basal portion of the cylinder. The molded member is loaded on the X-Y movement mechanisms 23 and 24, so that it is moved relative to the ultrasonic wave transmission solid horn 3 and the distal end 3*a* is traced along the resin material liquid guide groove 10. Different from the ordinary assembling robot movement control mechanism in which a positioning accuracy from point to point is required, the X-Y movement mechanisms 23 and 24 are required to have a strict accuracy in movement orbit and movement speed. Accordingly, a mechanism similar to an arc welding robot is desirably used.

According to the first through fourth embodiments, two or more kinds of liquids, which are hardened by reaction, can be mixed without a need of a provision of any mixing vessel. Accordingly, the mixing apparatus itself can be made small in size. As a resultant effect, environmental pollution can be avoided as much as possible, disposal of wastes can be reduced, and labor safety can be enhanced.

Embodiment 5

Figure 9:
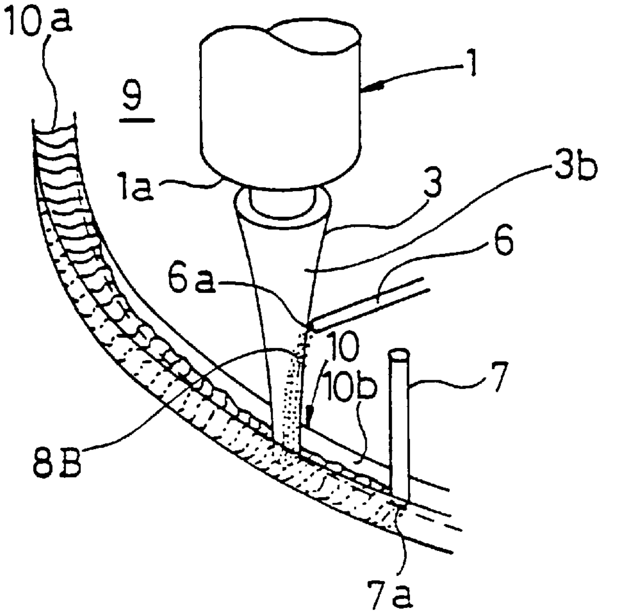
FIG. 9 is a perspective view for explaining a method and an apparatus for mixing two or more kinds of resin material liquids according to a fifth embodiment of the present invention.
Figure 10:
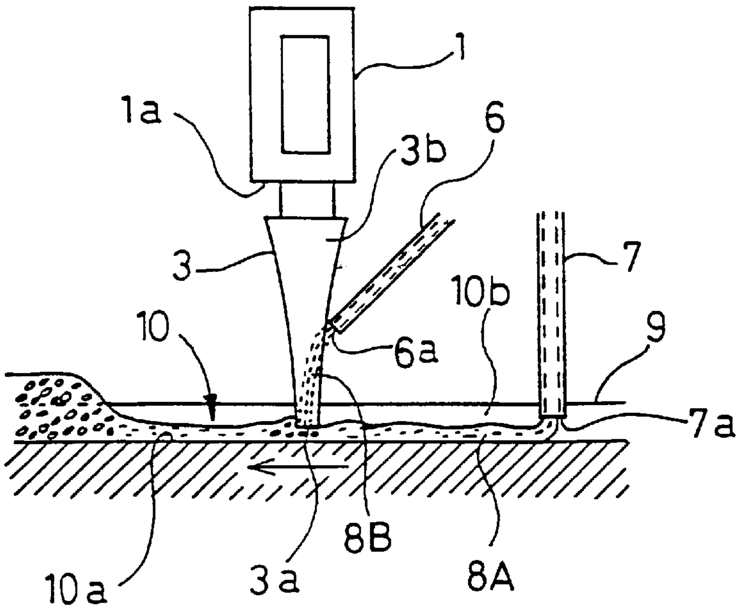
FIG. 10 is a partly enlarged view for explaining a mixed state of resin obtained by the method of FIG. 9.
Figure 11:
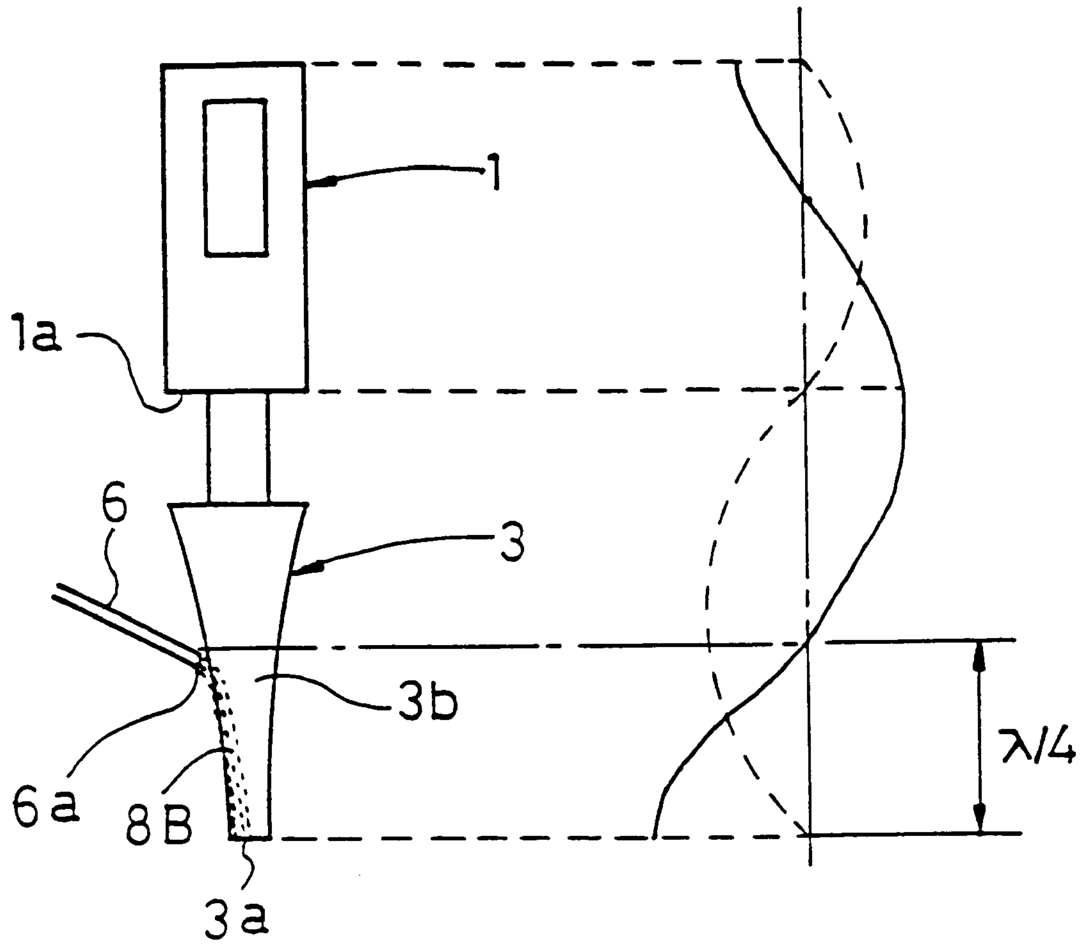
FIG. 11 is an explanatory view showing a positional relationship between a feed tube and an ultrasonic wave transmission solid horn of FIG. 9.

In FIGS. 9 to 11, like component parts of Embodiments 1 through 3 are denoted by like reference numerals and description is made only with respect to different points.

The resin outlet port 7*a* of the feed tube 7 is installed within the resin material liquid guide groove 10. The resin material liquid 8A is allowed to flow directly into the resin material liquid guide groove 10. The depth of the resin material liquid 8A to the bottom surface 10*a* is about 2 mm immediately after the resin material liquid 8A is poured into the resin material liquid guide groove 10. The distal end face 3*a* of the ultrasonic wave transmission solid horn 3 is disposed at a location higher by a predetermined length from the bottom surface 10*a* (about 1 mm from the bottom surface 10*a*). The side skin surface 3*b* of the ultrasonic wave transmission solid horn 3 is located with a predetermined space from the wall surface 10*b* so that the side skin surface 3*b* will not contact the wall surface 10*b*. The distal end part of the feed tube 7 is moved relative to the molded member 9 along the resin material liquid guide groove 10. The distal end part of the ultrasonic wave transmission solid horn 3 is located with a space with respect to the resin outlet port 7*a* in an extending direction of the resin material liquid guide groove 10. The distal end 3*a* of the ultrasonic wave transmission solid horn 3 is in contact with the resin material liquid 8A poured into the resin material liquid guide groove 10. The resin outlet port 6*a* of the feed tube 6 is faced onto the side skin surface 3*b* of the ultrasonic wave transmission solid horn 3, and the resin material liquid 8B poured out of the resin outlet port 6*a* rapidly flows down along the side skin surface 3*b* while being supplied with ultrasonic vibrations. The ultrasonic wave transmission solid horn 3 is followed by the feed tube 7 along the resin material liquid guide groove 10, and the resin material liquids 8A and 8B are simultaneously supplied with the ultrasonic vibrations and mixed together within the resin material liquid guide groove 10. By this, a foamed member is formed along the resin material liquid guide groove 10.

According to the fifth embodiment, the resin material liquid (polyol) which is large in feed amount is fed to the resin material liquid guide groove 10 first, and then the resin material liquid (isocyanate), which is small in feed amount, is fed along the side skin surface 3*b* so that they are mixed together, with the resin material liquid 8B superimposed on the resin material liquid 8A. Accordingly, a smooth mixing can be obtained. The adhesive force of the resin material liquid 8B with respect to the side skin surface 3*b* is larger than that of the resin material liquid 8A with respect to the side skin surface 3*b*, but the adhesive force of the resin material liquid 8A with respect to the molded member 9 is smaller than that of the resin material liquid 9B with respect to the molded member 9. Accordingly, also from this point of view, it is preferable that the resin material liquid 8A is fed first. In case the feed amounts of the resin material liquids 8A and 8B are equal, the resin material liquid 8A having a smaller adhesive force with respect to the side skin surface 3*b* is preferably poured along the side skin surface 3*b*. In order to carry out the method of this embodiment, the mixing apparatus shown in FIGS. 7 and 8 can be used.

According to the fifth embodiment, since there is provided a method for applying ultrasonic vibrations to the resin material liquids within the resin material liquid guide groove, the resin material liquids can be prevented from scattering outside the groove in the objective member as such as possible. Accordingly, in case a wall surface constituting a part of the molded member is present in an area very near the resin material liquid guide groove, the resin material liquids can be prevented from being adhered to the wall surface and the number of processes for cleaning the molded member can be reduced. Further, since a constant amount of the resin material liquids can positively be fed into the resin material liquid guide groove without allowing the resin material liquids to scatter, the ratio of the resin material liquids can be stabilized, and thus the hardening of the resin (in case of a foamed member, foam hardening condition) can be stabilized. Furthermore, one resin material liquid is poured into the resin material liquid guide groove first and then the other resin material liquid is poured down along the side skin surface of the ultrasonic wave transmission solid horn while being supplied with ultrasonic vibrations. Accordingly, since two or more kinds of resin material liquids are hardened without being waved, the resin can provide a good appearance after hardening. In this case, if it is arranged such that the resin material liquid which is smaller in flow rate is poured down along the side skin surface of the ultrasonic wave transmission solid horn, there can be obtained a resin having much better outer appearance. In case the resin outlet port of the other feed tube is installed at a location within a range from the distal end face of the ultrasonic wave transmission solid horn to a quarter wavelength of acoustic waves propagating through the ultrasonic wave transmission solid horn, the resin material liquid poured on the side skin surface of the ultrasonic wave transmission solid horn can rapidly flows down. Thus, the side skin surface can be maintained in its clean state.

Embodlient 6

Figure 12:
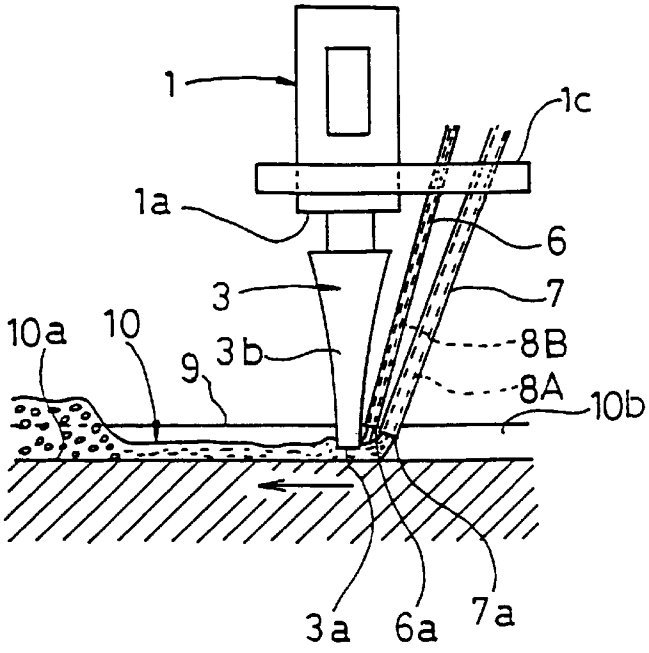
FIG. 12 is an explanatory view of a method and an apparatus for mixing two or more kinds of resin material liquids according to a sixth embodiment of the present invention.
Figure 13:
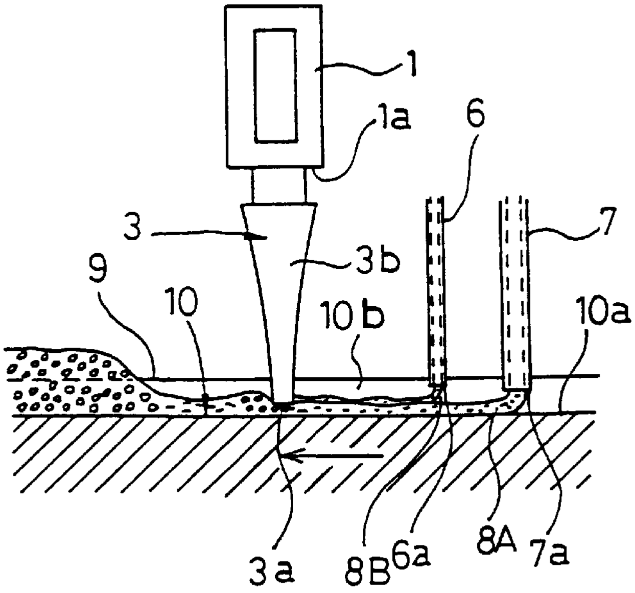
FIG. 13 is an explanatory view of a method and an apparatus for mixing two or more kinds of resin material liquids according to a seventh embodiment of the present invention.

In FIG. 12, like component elements of Embodiments 1 through 3 are denoted by like reference numerals, detailed description thereof is omitted and only different points are described.

The resin outlet ports 6*a* and 7*a* of the food tubes 6 and 7 are located close to each other within the resin material liquid guide groove 10. Two or more kinds of resin material liquids 8A and 8B are simultaneously poured into the resin material liquid guide groove 10. The feed amount of the resin material liquid 8A (polyol) fed by the feed tube 7 is large, and the feed amount of the resin material liquid 8B (isocyanate) fed by the feed tube 6 is small. Accordingly, it is preferable in view of carrying out a smooth mixing that the resin material liquids 8A and 8B are mixed together, with the resin material liquid 8B which is smaller in feed amount, superimposed on the resin material liquid 8A which is larger in feed amount. Since the adhesive force of the resin material liquid 8A with respect to the molded member 9 is smaller than that of the resin material liquid 8B with respect to the molded member 9, it is preferable also from this point of view that the resin material liquids 8A and 8B are mixed together, with the resin material liquid 8B superimposed on the resin material liquid 8A. The depth of the resin material liquids 8A and 8B to the groove bottom 10*a* is about 2 mm immediately after the resin material liquids 8A and 8B are poured into the resin material liquid guide groove 10. The distal end face 2*a* of the ultrasonic wave transmission solid horn 3 is disposed at a location higher by a predetermined length from the groove bottom 4*a* (about 1 mm high from the groove bottom 4*a*), and the side skin surface 3*b* of the ultrasonic wave transmission solid horn 3 is located with a predetermine space from the wall surface 10*b* so that the side skin surface 3*b* will not contact the wall surface 10*b*. The vibrator 1 is provided with a support flange 1*c*. Distal end parts of the feed tubes 6 and 7 are secured to this support flange 1*c*.

The distal end parts 6*a* and 7*a* of the feed tubes 6 and 7 are transferred relative to the molded member 9 along the resin material liquid guide groove 10. The distal end part of the ultrasonic wave transmission solid horn 3 is located immediately after the resin outlet ports 6*a* and 7*a* in a progressing direction thereof. The distal end face 3*a* of the ultrasonic wave transmission solid horn 3 is in contact with the resin material liquids 8A end 8B poured into the resin material liquid guide groove 10. The ultrasonic wave transmission solid horn 3 is followed by the feed tubes 6 and 7 along the resin material liquid guide groove 10. The resin material liquids 8A and 8B are supplied with ultrasonic vibrations simultaneously or immediately after the resin material liquids 8A and 8B are poured into the resin material liquid guide groove 10 and mixed together in the resin material liquid guide groove 10. As a consequence, a foamed member is formed along the resin material liquid guide groove 10.

Embodiment 7

In this embodiment, the distal end part of the ultrasonic wave transmission solid horn 3 and the resin outlet ports 6*a* and 7*a* of the feed tubes 6 and 7 are located within the resin material liquid guide groove 10. The resin outlet ports 6*a* and 7*a* are spaced apart from each other in an extending direction of the resin material liquid guide groove 10. Here, one resin material liquid (polyol) 8A is poured into the resin material liquid guide groove 10 first, and then the other resin material liquid (isocyanate) 8B is poured into the resin material liquid guide groove 10. The depth of the resin material liquids 8A and 8B to the groove bottom 10*a* is about 2 mm immediately after the resin material liquids 8A and 8B are poured into the groove bottom 10*a*, the distal end face 3*a* of the ultrasonic wave transmission solid horn 3 is disposed at a location higher by about 1 mm from the groove bottom 10*a*, and the distal end part of the ultrasonic wave transmission solid horn 3 is spaced apart from the feed tube 6 in a direction extending along the resin material liquid guide groove 10. By moving the resin outlet ports 6*a* and 7*a* of the feed tubes 6 and 7 along the resin material liquid guide groove 10, the resin material liquid 8A is poured into the resin material liquid guide groove 10 first and then the resin material liquid 8B is poured following the resin material liquid guide groove 10. The distal end part of the ultrasonic wave transmission solid horn 3 is in contact with the resin material liquids 8A and 8B poured into the resin material liquid guide groove 10 and followed along the resin material liquid guide groove 10 while applying ultrasonic vibrations to the resin material liquids 8A and 8B. By this, the resin material liquids 8A and 8B are mixed together within the resin material liquid guide groove 10, and a foamed member is formed along the resin material liquid guide groove 10.

This method can be carried out utilizing the mixing apparatus shown in FIGS. 7 and 8.

According to the sixth and seventh embodiments, the resin material liquids can be prevented from scattering outside the groove in the objective member. Accordingly, in case the wall surface constituting a part of the molded member is present in an area close to the resin material guide groove, the resin material liquids can be prevented from adhering to the wall surface, and the number of cleaning operations with respect to the molded member can be reduced. A constant amount of the resin material liquids can positively be fed into the respective resin material liquid guide groove without allowing the resin material liquids to scatter, and a constant amount of the resin material liquids can positively be fed into the resin material liquid guide groove. Accordingly, the ratio of stabilization of the respective resin material liquids can be stabilized and the hardening state of thus obtained resin (in case of the foam resin, the foaming condition) can be stabilized.

What is claimed is:

1. A molded member having a resin material liquid guide groove formed in a surface thereof, said resin material liquid guide groove being coated with two or more kinds of resin material liquids such that:

said resin material liquids are allowed to flow down passing along a side skin surface of an ultrasonic wave transmission solid horn and drop from a distal end face of said ultrasonic wave transmission solid horn while applying ultrasonic vibrations to said resin material liquids, and are mixed in an aerial state and thereby are foam-hardened in said resin material liquid guide groove.

2. The molded member of claim 1, wherein said resin material liquid guide groove is shaped polygonal in section.

3. The molded member of claim 1, wherein said resin material liquid guide groove is shaped semi-arcuate in section.

4. A molded member having a resin material liquid guide groove formed in a surface thereof, said resin material liquid guide groove being coated with two or more kinds of resin material liquids such that:

at least one kind of resin material liquid of said resin material liquids is fed into said resin material liquid guide groove, and a distal end portion of an ultrasonic wave transmission solid horn is brought into contact with the fed resin material liquid while applying ultrasonic vibrations to the fed resin material liquid whereas the other kind of resin material liquid of said resin material liquids is allowed to flow down passing along a side skin surface of said ultrasonic wave transmission solid horn and flow down from a distal end face of said ultrasonic wave transmission solid horn to said resin material liquid guide groove while applying ultrasonic vibrations to the other kind of resin material liquid, and thereafter said resin material liquids are mixed and foam-hardened in said resin material liquid guide groove.

5. The molded member of claim 4, wherein said resin material liquid guide groove is shaped polygonal in section.

6. The molded member of claim 4, wherein said resin material liquid guide groove is shaped semi-arcuate in section.

7. A molded member having a resin material liquid guide groove formed in a surface thereof, said resin material liquid guide groove being coated with two or more kinds of resin material liquids such that:

said resin material liquids are fed to said resin material liquid guide groove, and a distal end portion of an ultrasonic wave transmission solid horn is brought into contact with the fed resin material liquids at a position close to a position where said resin material liquids are fed to said resin material liquid guide groove while applying ultrasonic vibrations to said resin material liquids, and thereafter said resin material liquids are mixed and foam-hardened in said resin material liquid guide groove.

8. The molded member of claim 7, wherein said resin material liquid guide groove is shaped polygonal in section.

9. The molded member of claim 7, wherein said resin material liquid guide groove is shaped semi-arcuate in section.

* * * * *